United States Patent Office 3,833,519
Patented Sept. 3, 1974

3,833,519
STABILIZERS FOR VINYL CHLORIDE-CONTAINING RESINS
Adam J. Ejk, Piscataway, and Robert C. Ringwood, Jr., Sewaren, N.J., assignors to M & T Chemicals Inc., Greenwich, Conn.
No Drawing. Filed July 10, 1972, Ser. No. 270,069
Int. Cl. C08f 45/62
U.S. Cl. 260—23 XA  9 Claims

ABSTRACT OF THE DISCLOSURE

Improved stabilizer compositions which require less tin to impart a given degree of heat stabilization to vinyl chloride-containing polymers are obtained using reaction products of diorganotin compounds with esters of aliphatic polyhydroxylated organic compounds in combination with certain barium derivatives. Up to 50% of the organotin reaction product present in a polymer composition can be replaced by barium compounds without a significant decrease in heat stabilization.

BACKGROUND OF THE INVENTION

Vinyl chloride polymers and copolymers are thermoplastic in nature and, therefore, require heating in order to soften them during fabrication operations such as molding, calendering, and extruding. The heat which these polymers can tolerate is limited in degree and duration by their tendency to decompose. This decomposition leads to deterioration of the physical properties of the resin. It also results in a severe darkening in color of the resin which prohibits its use in lightly colored or transparent articles. This latter property is obviously a major drawback to the use of vinyl chloride resins in many applications, and in order to overcome this several products have been proposed as stabilizers for vinyl chloride-containing polymers. In general, the stabilizers fall into three main classes namely, lead salts, barium/cadmium soaps, and organotin compounds.

Organotin compounds, particularly those which contain sulfur, have been found to be the most effective type of stabilizers for vinyl chloride polymers. These stabilizers have one disadvantage in that they are relatively expensive. It would, therefore, be desirable to replace at least a portion of the tin present in a given polymer formulation with a less expensive material without incurring any significant decrease in heat stability.

One objective of this invention is to extend the useful life of vinyl chloride polymers at elevated temperatures while delaying for as long as possible the development of initial discoloration. A second objective is to reduce the amount of tin required to achieve a given degree of heat stabilization.

Barium compounds, particularly soaps, i.e. salts of fatty acids, have been employed in combination with cadmium soaps as stabilizers for vinyl chloride polymers. The barium compounds alone are relatively poor stabilizers. Attempts to substitute barium phenates or soaps for a number of organotin compounds, including some known effective stabilizers for vinyl chloride polymers, has produced less than satisfactory results, in that the barium compounds have been shown to decrease rather than improve the heat stability of the resultant polymer composition. It was, therefore, considered most surprising to observe no significant decrease in stability when barium compounds were used to replace up to 50% by weight of diorganotin derivatives obtained by reacting at least one specified diorganotin oxide, hydroxide, or halide with esters derived from (1) compounds containing three to four hydroxyl groups, bonded to an aliphatic hydrocarbon radical and (2) a mercapto carboxylic acid, optionally in combination with one or more carboxylic acids containing eight or more carbon atoms.

SUMMARY OF THE INVENTION

An improved composition for imparting both short- and long-term heat stability to polymers wherein at least a major portion of the repeating units are derived from vinyl chloride, said composition being comprised at least in part of the reaction product of a dialkyltin oxide, dihydroxide or dihalide with a compound selected from the group consisting of esters and hydroxyesters derived from (1) polyhydroxylated compounds containing between 3 and 12 carbon atoms, which are present as an aliphatic hydrocarbon radical, and 3 or 4 hydroxyl radicals and (2) a mercaptocarboxylic acid or a mixture of a mercaptocarboxylic acid and a carboxylic acid containing more than 8 carbon atoms, wherein the improvement resides in the presence in said composition of at least one barium compound selected from the group consisting of phenates and derivatives of carboxylic acids containing more than 8 carbon atoms, with the proviso that the weight of said reaction product is at least equal to the weight of the barium compound.

DETAILED DESCRIPTION OF THE INVENTION

The Diorganotin Compound

The organotin components of the present stabilizer compositions are comprised at least in part of products obtained by reacting a dialkyltin oxide, hydroxide or halide with an ester derived from (a) an aliphatic polyhydroxylated compound containing between three and twelve carbon atoms and three or four hydroxyl groups and (b) one or more mercaptocarboxylic acids containing up to eight carbon atoms, optionally in combination with at least one carboxylic acid containing more than about eight carbon atoms. The resultant diorganotin compound may contain one or more free hydroxyl groups.

The amount of diorganotin reagent employed should be at least sufficient to react with all of the mercapto radicals (—SH) present in the ester. If the ester contains unreacted hydroxyl radicals, additional diorganotin reagent may be added, depending upon the desired tin content in the final product.

The molar ratio of carboxylic acid residues to mercaptocarboxylic acid residues present in the ester should not exceed about 2:1, respectively, to achieve optimum stabilization performance for the final product.

Each of the alkyl radicals bonded to the tin atom of the diorganotin derivative which is reacted with the ester contains between one and eight carbon atoms. Butyl radicals are preferred. In addition to the two alkyl radicals, the diorganotin compound employed to react with the ester may contain an oxygen atom, two hydroxyl or two halogen radicals.

It is difficult to assign structural formulae to the diorganotin component of the present stabilizer systems, since many may be polymeric in nature. The following structures are proposed using pentaerythritol as the polyhydroxylated compound, based on known reactions of the diorganotin starting materials.

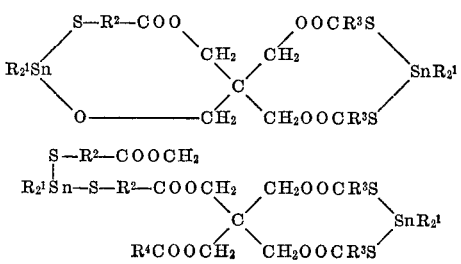

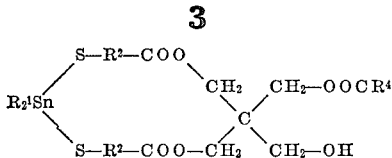

The type of carboxylic acid

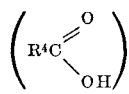

employed in preparing the ester will in large part determine the melting point of the final product. For example, when $R^4$ represents a saturated hydrocarbon radical, such as is present in stearic acid, the product is a solid. Preferred products are liquids wherein $R^4$ represents an aliphatic hydrocarbon radical containing one or more double bonds, such as would be present in the fatty acids derived from tall oil.

The diorganotin reaction products described in this specification include but are not limited to the products described in British Patent No. 1,027,781. The diorganotin reaction products are conveniently prepared by reacting a pre-formed ester or hydroxyester of a polyhydric alcohol with a dialkyl tin oxide in a suitable inert medium such as toluene from which water can be removed azeotropically as it is formed. As this type of reaction is also suitable for the formation of the ester starting material, it will be appreciated that in most instances both stages of the reaction, i.e. the esterification and subsequent reaction of the ester with the diorganotin compound can be carried out in the same reactor. Thus, the ester can be formed from the respective polyol and acids in an inert medium, and as soon as reaction is complete the dialkyl tin oxide can be added and the heating continued until the desired product is formed. The product can then be obtained from this mixture as a white powder by removal of the solvent and grinding of the residue.

Although the above process is a preferred route, it should in no way be taken as imposing a limitation on the scope of the invention as undoubtedly the products could readily be formed by alternative techniques. Examples of such modifications are to replace the dialkyl tin oxide by alternative compounds such as dialkyl tin dihydroxide, dichloride or dibromide. With the dihydroxide the reaction can be brought about in a manner similar to that used with oxide. With the dichloride and dibromide, however, it is preferable to use a base such as ammonia or pyridine in the reaction medium. Alternatively, the reaction could be brought about by reacting the organotin halide with the sodium salt of the mercapto ester.

The Barium Compound

Barium compounds suitable for use in the stabilizing compositions of this invention are phenates $Ba(OAr)_2$ and carboxylates

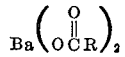

wherein Ar represents a phenyl radical and R represents an alkyl hydrocarbon radical containing between 8 and about 18 carbon atoms. Either or both of Ar and R may exhibit inert substituents which do not interfere with the performance of the compound as a co-stabilizer. Suitable substituents include alkyl, aryl, alkaryl, aralkyl, alkoxy, and nitro radicals.

The addition of one or more barium compounds considerably improves the degree of stabilization imparted to vinyl chloride polymers by a given concentration of one or more of the diorganotin reaction products of this invention. More importantly, the barium compounds can replace up to 50% by weight of the diorganotin compounds without significantly decreasing the degree of long-term heat stability imparted to a vinyl chloride-containing polymer using an amount of organotin compound equal to the weight of the combined barium and organotin compounds. It is, therefore, possible to significantly reduce the concentration of tin required to impart a given degree of stabilization, as will be demonstrated in the accompanying examples. The barium compound, when used alone, imparts only minimal stabilization to vinyl chloride-containing polymers. Some suitable barium compounds are considerably less expensive than organotin compounds. The compositions of this invention, therefore, offer a considerable economic advantage over prior art organotin stabilizers.

The increase in stabilizer efficiency imparted to the present organotin reaction products by the barium compounds is not observed when these reaction products are replaced by some more effective organotin stabilizers. The addition of barium compounds adversely affects the stabilization imparted to vinyl chloride-containing resins by many of these conventional organotin stabilizers, including di-n-butyltin-S,S'-bis(isooctyl mercaptoacetate) and butylthiostannoic anhydride. It would, therefore, appear that the beneficial effect resulting from the presence of the barium compounds is limited to only a select group of organotin compounds that includes the diorganotin reaction products described in this specification.

Suitable Polymer Substrates

Polymers suitable for use with the improved stabilizer compositions of this invention are those wherein at least a majority of the repeating units present are derived from vinyl chloride. The remaining repeating units can be derived from one or more ethylenically unsaturated compounds which copolymerize with vinyl chloride. Suitable comonomers include but are not limited to vinyl acetate, vinylidene chloride, esters of acrylic and methacrylic acids, acrylonitrile and olefins such as ethylene and propylene. This class of polymers will hereinafter be referred to as "vinyl chloride polymers."

Amount of Stabilizer

The stabilizing compositions of this invention are usually employed at concentrations of between 0.1 and 20 parts by weight per 100 parts of vinyl chloride polymer. The preferred concentration is between 0.1 and 3 parts. The exact value will be determined by the degree of stabilization required. Two criteria for determining the desired concentration of stabilizer are the highest temperature which the polymer will encounter during processing and use, and the length of time during which the polymer will be exposed to elevated temperatures. One advantage of the present stabilizer compositions is that they impart a longer useful life to heated polymer compositions than has heretofore been achieved using equivalent concentrations of conventional organotin stabilizers, based on the amount of tin present. For many applications a slight degree of discoloration can be tolerated so long as the physical properties of the polymer are not excessively degraded and the polymer does not form a charred residue which adheres to the wall of the extruder or other processing apparatus.

The following examples demonstrate perferred embodiments of this invention and should not be interpreted as limiting the scope thereof. All parts and percentages are by weight unless otherwise specified.

EXAMPLE 1

Preparation of the reaction product of di-n-butyltin oxide with the ester derived from pentaerythritol, mercaptoacetic acid and fatty acids of tall oil.

Tall oil fatty acid (11.1 parts) and mercaptoacetic acid (2.85 parts) were charged into a reaction vessel which was then flushed out with dry nitrogen. The contents of the reaction vessel were heated to between 60 and 70° C., at which time pentaerythritol (4.08 parts) was added, followed by 0.02 parts of concentrated sulfuric acid. The reaction mixture was then heated to a tempertaure of about 110° C., at which time the water formed as a by-product of the esterification reaction began to distill and was collected in a suitable trap for subsequent removal. When about 80% of the theoretical amount of water had been collected, the pressure inside the reaction vessel was gradually reduced so as to maintain the boiling point of the reaction mixture below about 150° C. and distill the water as rapidly as possible. When the evolution of water ceased, the heating of the reaction mixture was continued for about 30 minutes. The temperature of the reaction mixture was then allowed to cool to 90° C., at which time nitrogen was admitted into the vessel to attain ambient pressure. Dibutyltin oxide (3.96 parts) was then charged into the reaction vessel, the pressure reduced to about 685 mm. of mercury and the contents heated to between 130 and 150° C. Within this temperature range the water resulting from the reaction distilled and collected in a trap. When the evolution of water was substantially complete, heating was continued for an additional 30 minutes, after which the contents of the vessel were allowed to cool. Nitrogen was admitted to the vessel when the temperature of the reaction mixture reached between 110 and 120° C. The dibutyltin derivative of the ester, a brown viscous liquid, was obtained in about 96% yield.

gradually fused to form a continuous band around one mill as a continuous sheet. The sheet was cut into squares measuring about 2.54 cm. on each side and the squares of the rollers. After a total milling time of between four and five minutes, the band was cut and removed from the placed in a circulating air oven maintained at a temperature of 190° C. Samples were removed at 10 minute intervals and rated as to color using the following scale:

7—clear, water-white
6—off-white
5—slightest degree of yellowing
4—definite yellow color
3—deep yellow-brown color
2—deep brown color
1—dark brown to black color The organotin compounds employed in the stabilizer compositions listed in Table I are defined by numbers as follows:

Organotin Compound
No.                    Organotin Compound
1 _____ Di-n-butyltin-S,S'-bis(isooctyl mercaptoacetate) (control).
2 _____ Butyl thiostannoic anhydride (control).
3 _____ 1 (66.6%); 2 (26.7%); 2,6-di-t-butyl-p-cresol (6.7%) (control).
4 _____ Product of Example 1.

TABLE I

| Organotin compound number | Parts of organotin compound | Percent tin in total composition | Parts of barium phenate | Color rating after— | | | | | | |
|---|---|---|---|---|---|---|---|---|---|---|
| | | | | 0 min. | 10 min. | 20 min. | 30 min. | 40 min. | 50 min. | 60 min. |
| 1 | 2.0 | 0.36 | 0 | 7 | 6 | 5+ | 4+ | 4+ | | 3+ |
| 1 | 1.6 | 0.29 | 0.4 | 5 | 5 | 4+ | 4 | 3 | | 1+ |
| 2 | 1.0 | 0.52 | 0 | 7 | 6 | 5 | 3+ | 2 | 1+ | 1 |
| 2 | 0.75 | 0.39 | 0.25 | 4 | 3+ | 3 | 3 | 2 | 1+ | 1 |
| 2 | 0.25 | 0.13 | 0.75 | 3 | 2+ | 2 | 1+ | 1 | 1 | 1 |
| 3 | 1.0 | 0.26 | 0 | 7 | 6 | 6 | 4+ | 4 | 3 | 2 |
| 3 | 0.75 | 0.20 | 0.25 | 6 | 6 | 5 | 4 | 3+ | 2 | 1 |
| 3 | 0.25 | 0.07 | 0.75 | 4 | 4 | 3 | 2+ | 1 | 1 | 1 |
| 4 | 2.0 | 0.18 | 0 | 6 | 6 | 5 | 4 | [1]3− | 2 | 1+ |
| 4 | 1.5 | 0.14 | 0.5 | 5+ | 5+ | 5 | 4 | 3+ | 2 | 1+ |
| 4 | 0.5 | 0.05 | 1.5 | 4 | 4 | 3 | 2+ | 2 | 1 | 1 |
| | 0 | 0 | 2.0 | 2+ | 1+ | 1 | 1 | 1 | 1 | 1 |
| 4 | 1.9 | 0.17 | 0.1 | 6 | 6− | 5 | 4 | 3 | 2 | 1+ |
| 4 | 1.0 | 0.09 | 1.0 | 4+ | 4+ | 4 | 3+ | 3 | 2 | 1 |
| | 0 | 0 | 0 | [2]1 | | | | | | |

[1] Sample exhibited numerous dark streaks in addition to background color.
[2] Sample turned black during milling, adhered to mill rollers.

EXAMPLE 2

Preparation of Stabilized Vinyl Chloride Polymer Compositions

The efficacy of the stabilizing compositions of this invention was demonstrated by blending the amounts of stabilizers as specified in the following Table I with 100 parts by weight of a commercial poly(vinyl chloride) available under the trademark "PVC 450" and manufactured by Diamond Shamrock. A number of known organotin stabilizers were also evaluated to determine the effect of adding a barium compound (a barium phenate identified as "L-2106," manufactured by the Lubrizol Corporation) on the heat stability of poly(vinyl chloride).

The test samples were prepared by blending together 100 parts of poly(vinyl chloride) resin, 0.5 parts of a paraffin wax exhibiting a melting point of about 94° C. and the amounts of organotin and barium compounds as specified in Table I. The blended ingredients were then placed on a two-roll differential speed mill wherein the rolls were heated to a temperature of 164° C. The mixture It is evident from the data in Table I that polymer compositions containing the reaction product of Example 1 are the only ones which maintained at least an equivalent level of long-term heat stability (after between 40 and 60 minutes of heating) when a portion of the organotin compound is replaced by the barium phenate. It should be noted that the stabilizer composition wherein the weight ratio of barium phenate to organotin compound 4 is 3:1, respectively, is outside the scope of this invention.

The increase in stabilizer efficacy achieved using the compositions of this invention in combination with three known organotin stabilizers is demonstrated by the data contained in Table II. Each of the three known stabilizers was tested alone and in combination with the compositions of this invention. In each instance the heat stability observed following between 30 and 60 minutes of heating is significantly greater for those polymer compositions containing the mixed stabilizer than for those containing the corresponding known stabilizer alone, even though both samples contained the same amount of tin.

TABLE II

| Organotin compound number | Parts of organotin compound | Percent tin in total composition | Parts of barium phenate | 0 min. | 10 min. | 20 min. | 30 min. | 40 min. | 50 min. | 60 min. |
|---|---|---|---|---|---|---|---|---|---|---|
| 1 | 1.4 | 0.25 | 0 | 7 | 6+ | 5 | 4 | 4 | 3 | 2 |
| 1 and 4 | {1.0 (1) / 0.75 (4)} | 0.25 | 0.4 | 6 | 6 | 5+ | 5 | 4+ | 4 | 3+ |
| 2 | 0.5 | 0.27 | 0 | 5+ | 5 | 4 | 3 | 2 | 1 | 1 |
| 2 and 4 | {0.4 (2) / 0.75 (4)} | 0.28 | 0.4 | 5+ | 5+ | 5 | 4+ | 4 | 3 | 2 |
| 3 | 1.0 | 0.26 | 0 | 7 | 6+ | 6 | 4+ | 4 | 3 | 2 |
| 3 and 4 | {0.75 (3) / 0.75 (4)} | 0.26 | 0.4 | 6 | 6 | 5+ | 5 | 4+ | 4 | 3 |

What is claimed:

1. In an improved composition for imparting long-term heat stability to polymers wherein at least a major portion of the repeating units are derived from vinyl chloride, said composition comprising the reaction product of a dialkyltin compound selected from the group consisting of oxides, dihydroxides and dihalides wherein the alkyl radicals contain between 1 and 8 carbon atoms, with a mercaptoester derived from the reaction of $n$ moles of a mercaptocarboxylic acid per mole of a polyhydric alcohol containing 3 or 4 hydroxyl groups and 3 to 12 carbon atoms such that $n$ represents an integer between 1 and the total number of hydroxyl groups present on said alcohol, with the proviso (1) that any hydroxyl groups not reacted with the mercaptocarboxylic acid are present as free hydroxyl radicals, or is esterified by the reaction of said hydroxyl radicals with a monocarboxylic acid containing more than 8 carbon atoms or are present as the reaction products of the hydroxyl radical with said dialkyltin compound, and (2) that the number of said ester residues is not equal to more than twice the number of mercaptoester residues and (3) the number of moles of said diorganotin compound reacted is at least equal to the number of moles of mercaptoacid ester residues, the improvement which resides in the presence, in said composition, of a barium compound selected from the group consisting of phenates and carboxylates wherein the carboxylic acid residue contains more than 8 carbon atoms, the weight of said reaction product being at least equal to the weight of said barium compound.

2. The improved composition of Claim 1 wherein the two alkyl radicals of the diorganotin reaction product each contain four carbon atoms.

3. The improved composition of Claim 1 wherein said ester is derived from pentaerythritol, mercaptoacetic acid and fatty acids derived from tall oil.

4. The improved composition of Claim 1 wherein the barium compound is a barium phenate and wherein the weight of the barium phenate is less than the weight of said reaction product.

5. In an improved stabilized vinyl chloride polymer composition exhibiting long-term resistance to the deteriorative effects of heat wherein the polymer composition incorporates between 0.1 and 20 parts by weight per 100 parts of said vinyl chloride polymer, of a stabilizer comprising the reaction product of a dialkyltin compound selected from the group consisting of oxides, dihydroxides and dihalides wherein the alkyl radicals contain between 1 and 8 carbon atoms, with a mercaptoester derived from the reaction of $n$ moles of a mercaptocarboxylic acid per mole of a polyhydric alcohol containing 3 or 4 hydroxyl groups and 3 to 12 carbon atoms such that $n$ represents an integer between 1 and the total number of hydroxyl groups present on said alcohol, with the proviso (1) that any hydroxyl groups not reacted with the mercaptocarboxylic acid are present as free hydroxyl radicals, or is esterified by the reaction of said hydroxyl radicals with a monocarboxylic acid containing more than 8 carbon atoms or are present as the reaction products of the hydroxyl radical with said dialkyltin compound, and (2) that the number of said ester residues is not equal to more than twice the number of mercaptoester residues and (3) the number of moles of said diorganotin compound reacted is at least equal to the number of moles of mercaptoacid ester residues, the improvement which resides in the presence, in said composition, of a barium compound selected from the group consisting of phenates and carboxylates wherein the carboxylic acid residue contains more than 8 carbon atoms, the weight of said reaction product being at least equal to the weight of said barium compound.

6. The improved stabilized vinyl chloride polymer composition of Claim 5 wherein the two alkyl radicals of the diorganotin reaction product each contain four carbon atoms.

7. The improved stabilized vinyl chloride polymer composition of Claim 5 wherein said ester is derived from pentaerythritol, mercaptoacetic acid and fatty acids derived from tall oil.

8. The improved stabilized vinyl chloride polymer composition of Claim 5 wherein the barium compound is a barium phenate and wherein the weight of the barium phenate is less than the weight of said reaction product.

9. The improved stabilized vinyl chloride polymer composition of Claim 5 wherein the concentration of said stabilizer is between 0.1 and 3 parts by weight per 100 parts of vinyl chloride polymer.

References Cited

UNITED STATES PATENTS

| | | | |
|---|---|---|---|
| 3,518,223 | 6/1970 | Fath et al. | 260—45.75 |
| 3,069,447 | 12/1962 | Mack | 260—429.7 |
| 3,390,112 | 6/1968 | Scullin | 260—23 |
| 2,954,363 | 9/1960 | Kuehne et al. | 260—45.75 |

FOREIGN PATENTS

| | | | |
|---|---|---|---|
| 649,989 | 10/1962 | Canada | 260—45.75 |

V. P. HOKE, Primary Examiner

U.S. Cl. X.R.

252—406; 260—45.75 K, 45.95 J